Jan. 1, 1924. 1,479,296

W. A. HAHN ET AL

RAILROAD BRAKE FULCRUM

Filed March 24, 1923

W. A. Hahn,
E. D. Sherrill,
Inventors

By C. A. Snow & Co.
Attorneys

Patented Jan. 1, 1924.

1,479,296

UNITED STATES PATENT OFFICE.

WALTER A. HAHN AND ESPY DEEMS SHERRILL, OF HICKORY, NORTH CAROLINA.

RAILROAD-BRAKE FULCRUM.

Application filed March 24, 1923. Serial No. 627,517.

*To all whom it may concern:*

Be it known that we, WALTER A. HAHN and ESPY D. SHERRILL, citizens of the United States, residing at Hickory, in the county of Catawba and State of North Carolina, have invented a new and useful Railroad-Brake Fulcrum, of which the following is a specification.

This invention aims to provide a simple means whereby a fulcrum member adapted to carry a lever used in a common and known form of brake mechanism may be assembled securely but adjustably with the brake beam to permit a shifting of the lever, as called for by the brake equipment.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
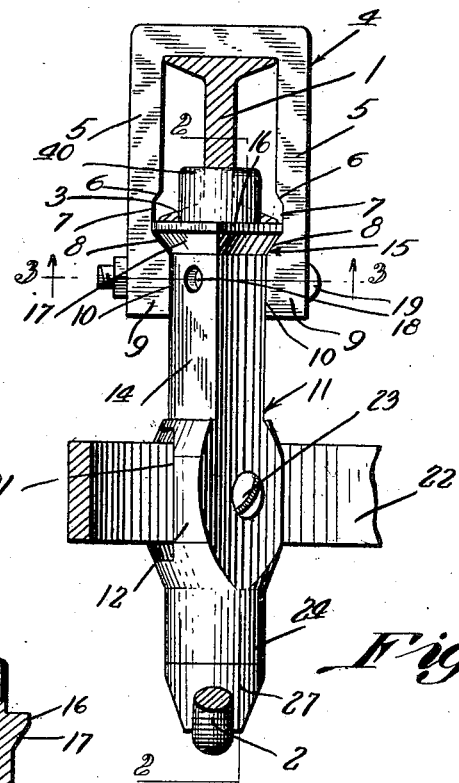
Figure 2:
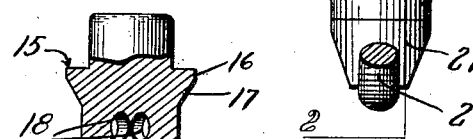
Figure 3:
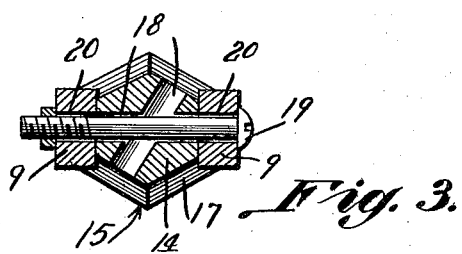

Figure 1 shows in elevation, a device constructed in accordance with the invention, sundry elements being in section; Figure 2 is a longitudinal section of the fulcrum member, parts remaining in elevation, the view being in substance, a section on the line 2—2 of Figure 1; Figure 3 is a cross section on the line 3—3 of Figure 1.

The numeral 1 marks a brake beam, which may be of any desired cross section, the beam being sustained by a truss rod 2 as is common in the art. An opening 3 is fashioned in one edge of the brake beam 1.

A U-shaped yoke 4 is supplied and includes arms 5, the yoke being straddled on the brake beam 1, and the arms 5 being provided in their inner surfaces with recesses 6 comprising parallel walls 7 and inwardly inclined walls 8. The arms 5 of the yoke 4 terminate in enlargements 9 having parallel inner surfaces 10. A fulcrum member or strut 11 is supplied and includes a body 12 and a neck 14 which is polygonal in cross section. The neck 14 carries an enlarged head 15 which is polygonal in cross section, oppositely disposed edge surfaces 16 of the head being parallel to each other the head embodying inclined surfaces 17. A lug 40 projects from the head 15. The fulcrum member 11 is located as shown in Figure 1, oppositely disposed parallel surfaces of the neck 14 cooperating with the parallel surfaces 10 of the enlargements 9 on the arms 5 of the yoke 4. The oppositely disposed inclined surfaces 17 of the head 15 cooperate with the corresponding walls 8 of the recesses 6, and the parallel edge surfaces 16 of the head 15 coact with the parallel walls 7 of the recesses 6. Thus the fulcrum member 11 is held on the yoke 4 against rotation, the lug 40 being received in the opening 3 of the brake beam 1, the securing element 19 being engaged in openings 20 formed in the enlargements 9 of the yoke 4 and in either one of a pair of transverse openings 18 formed in the neck 14 of the fulcrum member 11, the openings 18 being disposed at angle to each other.

The body 12 of the fulcrum member 11 has a slot 21 wherein a lever 22 is mounted to swing, the lever being carried by a pivot element 23 located in openings 26 formed in the body 12. There is a longitudinal bore 25 in the fulcrum member 11. The numeral 24 marks a foot forming part of the fulcrum member 11 and in this foot, a portion of the bore 25 is located, the bore communicating with the slot 21. A seat 27 is provided, and has a notch 28 receiving the truss rod 2, the seat having a stem 29 journaled in the bore 25.

When it is desired to alter the position of the lever 22, the securing element 19 is removed, the fulcrum 11 is detached from the yoke, the fulcrum member being turned on its axis through the desired angle and being replaced in the yoke, the securing element 19 being mounted in place in the other of the openings 18. Since the seat 27 has the stem 29 which is rotatable in the bore 25 of the fulcrum member, the truss rod 2 may still be mounted in the notch 28 of the seat, when the fulcrum member 11 has been adjusted on its axis, as aforesaid, to permit the lever 22 to assume a new position.

What is claimed is:—

1. In a device of the class described, a yoke having parallel surfaces, a fulcrum member having parallel surfaces cooperating with the parallel surfaces of the yoke, the parallel surfaces of the fulcrum member being duplicated, to permit an axial adjustment of the fulcrum member, a securing element connecting the yoke with the fulcrum member, the fulcrum member having a plurality of openings for the reception of the securing element and permitting an axial adjustment of the fulcrum member, and a lever mounted to swing on the fulcrum member.

2. A device of the class described, constructed as set forth in claim 1, and further characterized by the provision of a truss rod seat journaled for adjustment on the fulcrum member.

3. In a device of the class described, a brake beam, a yoke extended about the brake beam, a fulcrum member located within the yoke, the fulcrum member and the yoke having cooperating surfaces coacting to hold the yoke against rotation, a securing element connecting the fulcrum member with the yoke, the fulcrum member being provided with an end lug, and the beam having an opening wherein the lug is received, to prevent the yoke and the fulcrum member from shifting longitudinally of the beam, and a lever mounted to swing on the fulcrum member.

In testimony that we claim the foregoing as our own, we have hereto affixed our signatures.

WALTER A. HAHN.
ESPY DEEMS SHERRILL.

Witnesses:
S. W. LAWRENCE,
W. W. BEVOIRS.